April 7, 1936.                    W. T. KLINE                    2,036,723
                                FLEXIBLE BASKET
                              Filed Jan. 7, 1935

INVENTOR.
W. T. Kline
BY
M. Talbert Dick
ATTORNEY.

Patented Apr. 7, 1936

2,036,723

UNITED STATES PATENT OFFICE 2,036,723

FLEXIBLE BASKET

W. T. Kline, Omaha, Nebr.

Application January 7, 1935, Serial No. 633

3 Claims. (Cl. 150—51)

This invention relates in general to baskets, and particularly to service baskets as provided for customers' use in chain stores.

The principal object of my invention is to provide a basket that is exceptionally durable in use and refined in appearance.

A further object of this invention is to provide a basket which is insulated against shocks, thereby insuring not only long life, but a basket that will retain its original shape indefinitely.

A still further object of this invention is to provide a basket of a non-breakable type, that may be easily nested with others of its type for shipping or storage.

A still further object of my invention is to provide a basket which has a body of one-piece construction, and one that has no objectionable projections.

A still further object of this invention is to furnish a basket which is impervious to moisture.

A still further object of this invention is to provide a basket which is simple in construction and economical in manufacture and use.

These and other objects will be apparent to those skilled in the art.

My invention consists in the construction, arrangement and combination of the various parts of the article, whereby the objects contemplated are attained as hereinafter more fully set forth, pointed out in my claims and illustrated in the accompanying drawing, in which:

In stores where a self-serve system is used, it is the usual custom for the store to provide baskets for the customers' use in collecting their orders and bringing the same to the clerk at the counter. These baskets, when not in use, are normally kept in a bin near the entrance of the store and the clerk, after having removed the order from the basket, ordinarily tosses it back into the bin for continued use. This continued mistreatment of the baskets soon breaks handles and splinters the baskets to such an extent that they must be periodically replaced. Naturally, this is a source of expense, but there is also an added factor. While the baskets are splintered they offer a hazard or source of damage to customers' clothing and not infrequently the store is required to replace such damaged clothing. There is also the possibility of the loss of good will of the customer from such experience. Various types of baskets have been tried, but none of them have proved entirely satisfactory. I have overcome the above objections by providing a basket having a highly flexible framework of spring steel or comparable material covered with a resilient covering and the two mechanically bonded together.

Figure 1:
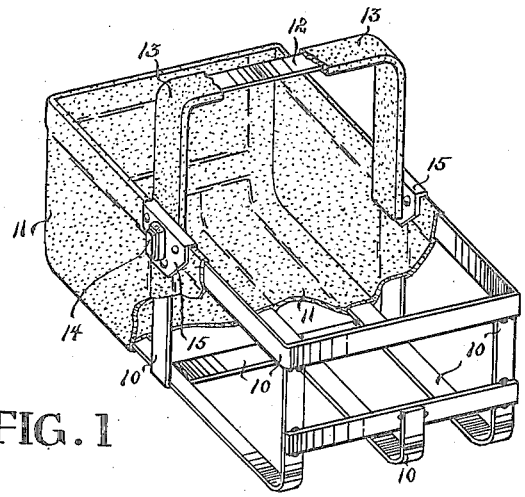
Fig. 1 is a perspective view of my non-breakable basket equipped with a detachable handle and with a portion of the covering removed to show the preferred construction of the framework.
Figure 8:
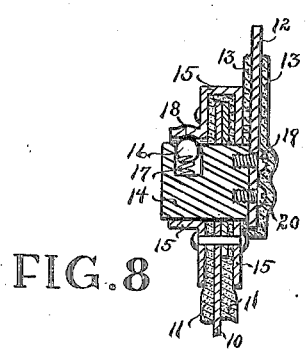
Fig. 8 is an enlarged vertical cross-sectional view of one means for fastening each side of a detachable handle to my non-breakable basket.

Referring to the drawing, in Fig. 1 I have shown the preferred construction of my basket and have used the numeral 10 to designate the resilient framework of my basket, which framework is entirely surrounded by and bonded to a flexible covering which I have designated by the numeral 11. The numeral 12 refers to the framework of the handle, and its flexible covering I have designated by the numeral 13. Fig. 1 shows my basket equipped with a detachable handle. Lugs 14 on the outer end portions of the detachable handle fit into corresponding openings in the fittings 15, as shown in Fig. 8. Each of these lugs 14 is yieldingly retained in the fittings 15 by means of a common ball retainer 16 and its spring 17. This ball engages a depression 18 in the fitting 15. The lugs 14 are fastened to the detachable handle by any suitable means, but in the drawing, I show them fastened by means of screws 19 and 20.

Figure 2:
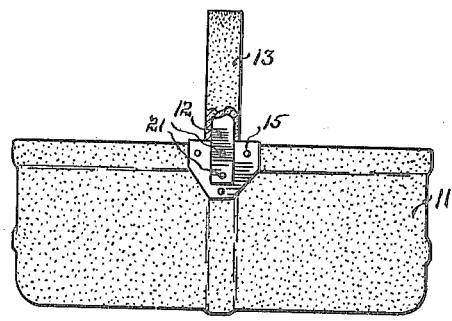
Fig. 2 is a side view of my non-breakable basket with a cut away portion showing a non-detachable handle solidly attached thereto.

In Fig. 2, I have shown a construction for a rigidly attached handle and have designated the retaining rivets joining the handle with the fittings 15, by the numeral 21. This result might also be accomplished by spot welding the handle to the frame or by extending the center piece of the frame to form the handle. In the alternative construction shown in Figs. 5 and 6, I have designated the upright wires collectively by the numeral 22 and the transverse wires collectively by the numeral 23. These wires should be of a resilient material and capable of returning to their original positions if temporarily forced out of it by a blow or fall.

Figure 4:
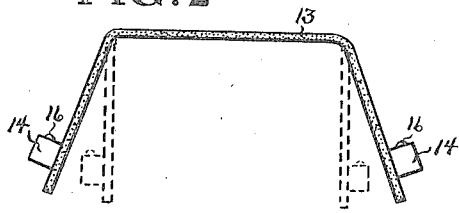
Fig. 4 is a vertical edge view of a preferred construction for a detachable handle, when removed from the basket, the dotted lines showing its form when in operating position on the basket.
Figure 3:
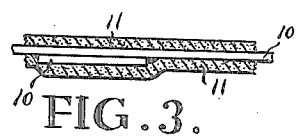
Fig. 3 is a cross-sectional view of a frame joint showing the relative positions of the two pieces of the frame being joined and the covering mechanically bonded thereto.
Figure 7:
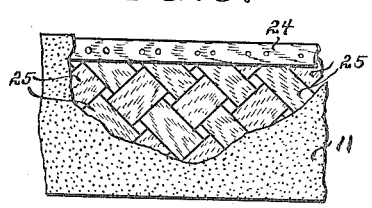
Fig. 7 is a side view of a portion of another alternative structure, using standard wooden basket construction for the frame and bonding the cover thereto.

In Fig. 7, I have designated the top frame portion by the numeral 24 and the interlaced body portion by the numeral 25. It will be noted from Figs. 1 and 4 that if it were desired for the purpose of shipping or storage to nest the baskets one within the other, the handle could be disengaged from the fittings 15, turned upside down, and re-engaged in the fittings so that it will conform to the inside of the basket.

Besides the advantages which my basket has in being non-breakable, the feature of having a covering impervious to moisture is of great value for the transportation of items packed in ice, and for resisting the attacks of rust on the framework.

I manufacture my non-breakable basket substantially as follows: I first prepare the framework 10 of any suitable material such as ribbon spring steel, wire rod, or wood. Of these three materials I particularly recommend the ribbon spring steel or metal wire rod. In the case of either the metal strips or rods the same may be properly secured together in the outline of a basket by the parts being either riveted together or spot welded together. Other means may be used, of course, to secure the various parts together to form the framework.

Figure 5:
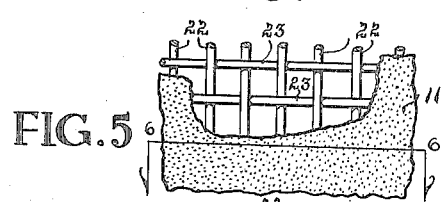
Fig. 5 is a detail side view of a portion of an alternative structure for the framework and the covering of the basket, using rod wire instead of metal strips.
Figure 6:
Fig. 6 is a cross-sectional view taken on line 6—6 of Fig. 5.

After the basket framework has been completed I cover the complete frame inside and out by suitable flexible and resilient sheet material such as rubber. Although this phase may be accomplished in various ways and other materials besides rubber may be used, I particularly recommend the use of uncured rubber. When using uncured rubber I place a sheet of the same inside the framework and a sheet on the outside of the framework, pressing the two sheets together in order to completely embed the framework, after which the rubber may be vulcanized or cured in any well known manner. After the rubber has been properly treated, it will be appreciated that a highly desirable basket will be provided inasmuch as both the inside and outside of the basket will be comparatively smooth and without objectionable projections. Also, the basket will be water-tight. A basket made in this manner will be both flexible and resilient and may be dropped or roughly handled without any possibility of breaking or damaging it. Although the basket may be temporarily distorted by use or under pressure, it will nevertheless when such force is removed, returned to its original shape. This is the result of not only the flexibility and resiliency of the frame, but also the flexibility and resiliency of the covering. By the metallic frame portion being completely embedded in the rubber or like, it will be protected against deterioration. If pressure is used in the molding when vulcanizing or curing the rubber around the frame, the frame will not only be embedded in the cured rubber, but a mechanical bond will result between the two. When a metal strip is used for a handle, a sheeting of the rubber may also be placed around the handle in the same manner. Regardless of whether a metal frame, a metal mesh frame as shown in Fig. 5, or a wooden frame as shown in Fig. 7, is used, the completed basket is exceptionally light in weight.

Some changes may be made in the construction and arrangement of my improved flexible basket without departing from the real spirit and purpose of my invention, and it is my intention to cover by my claims any modified forms of structure or use of mechanical equivalents which may be reasonably included within their scope.

I claim:

1. In a device of the class described, a resilient flexible open framework of spring metal, a sheet of flexible resilient soft rubber inside said framework, and a sheet of flexible resilient soft rubber outside of said framework; said two sheets being vulcanized together for embedding said framework and filling the openings in said framework.

2. In a device of the class described, a resilient flexible open framework of spring metal, a sheet of flexible resilient soft rubber inside said framework, a sheet of flexible resilient soft rubber outside of said framework; said two sheets being vulcanized together for embedding said framework and filling the openings in said framework, a fitting having an opening with a depression in it secured to each side of said framework, a bowed handle member, a lug on each end of said handle member capable of entering the openings in the two fittings respectively, and a metallic yieldable element on each of said lugs capable of engaging the depressions in the openings of said fittings respectively.

3. In a device of the class described, a resilient flexible open framework of spring metal, a sheet of flexible resilient soft rubber inside said framework, a sheet of flexible resilient soft rubber outside of said framework; said two sheets being vulcanized together for embedding said framework and filling the openings in said framework, a fitting on each side of said framework having a rectangular opening, a bail handle member of spring construction, and a rectangular lug on each end of said bail handle member capable of entering and engaging said openings of said fittings respectively.

W. T. KLINE.